S. F. JONES.
Mole-Plow.
No. 25,902.
Patented Oct. 25. 1859.
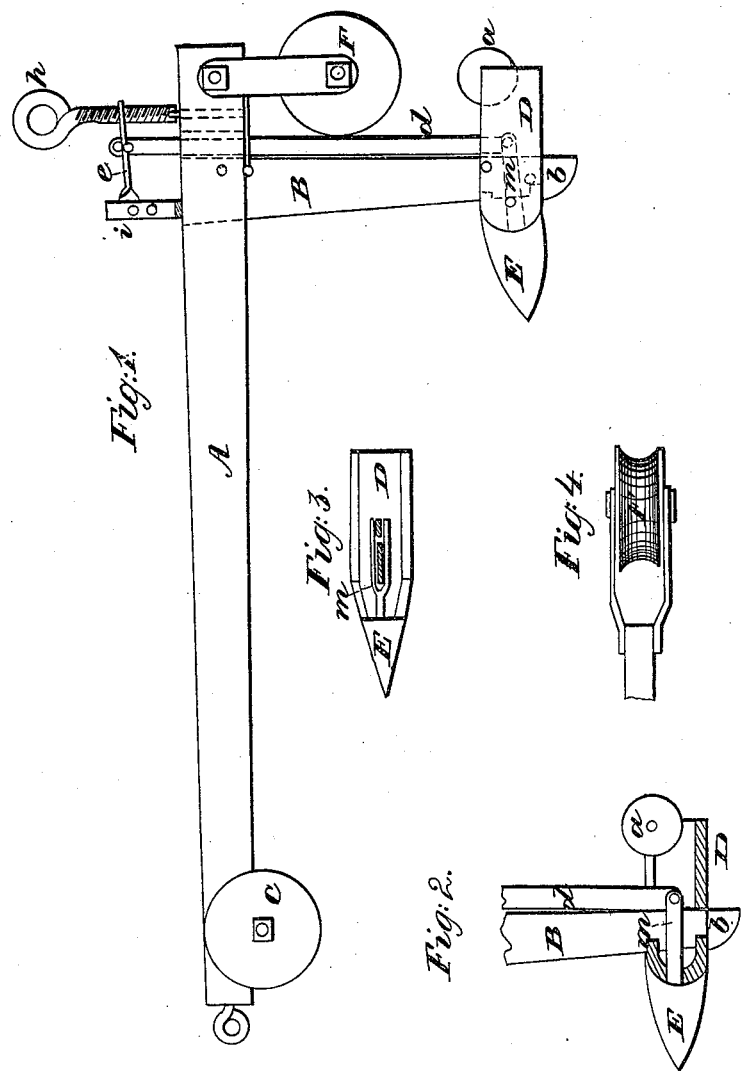

UNITED STATES PATENT OFFICE.

S. F. JONES, OF ST. PAUL, INDIANA.

IMPROVEMENT IN MOLE-PLOWS.

Specification forming part of Letters Patent No. 25,902, dated October 25, 1859.

*To all whom it may concern:*

Be it known that I, SAMUEL F. JONES, of St. Paul, in the county of Decatur and State of Indiana, have invented certain new and useful Improvements in Drain-Plows; and I do hereby declare that the following is a full, clear, and exact description of the same, reference being had to the accompanying drawings, and to the letters of reference marked thereon.

The nature of my invention consists in constructing and arranging the several parts of a drain-plow substantially in the manner hereinafter described.

In the drawings, Figure 1 represents a side elevation. Fig. 2 is a longitudinal vertical section of the mole and nose. Fig. 3 is a longitudinal horizontal section of the mole and nose. Fig. 4 is a view of the pulley for closing the opening made by the colter.

In the figures, A represents the beam of the plow, said beam being supported at its forward end by a truck, C.

B represents the colter or cutter, which is secured to the beam near its rear end. The lower end of the colter passes through a mole, D, and projects below said mole, the projection below being represented by $b$. The object of extending the end of the colter below the mole is that a small opening or drain may be formed at the bottom of the main drain, for the purpose of allowing water to settle in it when there is but a small quantity in the main drain.

D represents the mole, which is made hollow, its front end being made convex.

$a$ is a ball, which is secured to the mole at its rear. This ball is so secured to the mole that one-half or one-third of it will project above the top of the mole, and is secured upon an axis, which passes through its center, in such a manner that it will revolve upon said axis when the plow is in operation.

E' represents the nose, which is cast solid over a bar, $m$, said bar being made of wrought-iron. The nose is made pointed at its forward end and concave at its rear end, the concavity of the nose being made to correspond with the convexity of the mole, so that when the two are secured together they form a toggle-joint, the end of the nose, which is pointed, being allowed a vertical play. The bar $m$ extends back from the nose into the hollow of the mole, said bar being divided, as seen in Fig. 3, so that the colter may pass through it.

A perpendicular bar, $d$, which extends down through the rear of the beam behind the colter, is connected at its lower end to the bar $m$ by means of a pivot.

$i$ is a standard, secured on top of the beam over the colter.

$h$ represents a screw, which is attached at its lower end to a bolt, which passes through the beam, said bolt having a head on the under side of the beam, the bolt being allowed to turn in the beam.

$e$ represents a lever, one end of which is secured to the upright standard $i$, the bar $d$ being secured to the center of the said lever, and the screw $h$ passing through a screw in its other end. The object of this arrangement is clearly seen. By turning the screw $h$ the bearer either raises or depresses the bar $d$, and thus either raises or lowers the point of the nose E.

F is a pulley, which is secured to the beam behind the colter, and is for the purpose of closing the opening made by said colter. When the mole is drawn through the ground the ball $a$ on its rear end, projecting above its top, rolls and packs the top of the ditch made by the mole, and arches it in such a compact manner that the possibility of its falling in is almost entirely precluded.

By means of the arrangement of these several parts which have been described a very cheap and effective drain-plow is made—one which can be easily regulated, and one which forms a better and more durable drain than any other of its kind, and that with less power to draw it through the ground.

Having thus fully described my invention, what I claim as new, and desire to secure by Letters Patent, is—

1. The employment of the ball $a$, not generally, but when said ball is secured in such a manner upon the top of the rear of the mole that it will revolve when the mole is in motion, for the purpose of arching the top of the drain and closing the opening left by the colter, substantially as set forth.

2. The combination of the nose E, mole D, ball $a$, rod $d$, and wheel F, when the same are used for the purpose of forming and arching the drain and closing the opening of the colter, substantially as and for the purpose set forth.

SAMUEL F. JONES.

Witnesses:
JAMES TRIMBLE,
JOHN M. BUELL.